No. 640,515. Patented Jan. 2, 1900.
M. I. PUPIN.
ART OF DISTRIBUTING ELECTRICAL ENERGY BY ALTERNATING CURRENTS.
(Application filed May 21, 1895. Renewed Dec. 4, 1899.)
(No Model.) 2 Sheets—Sheet 1.
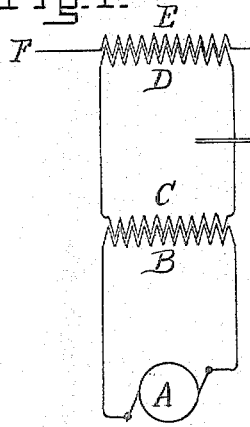
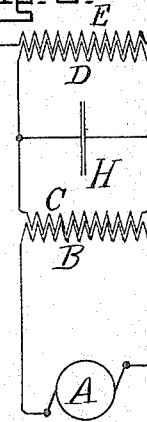
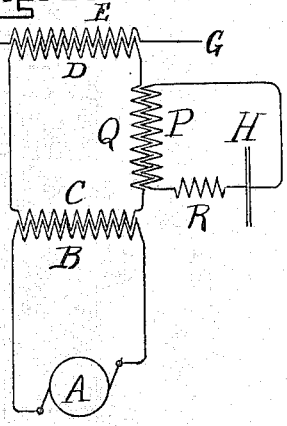
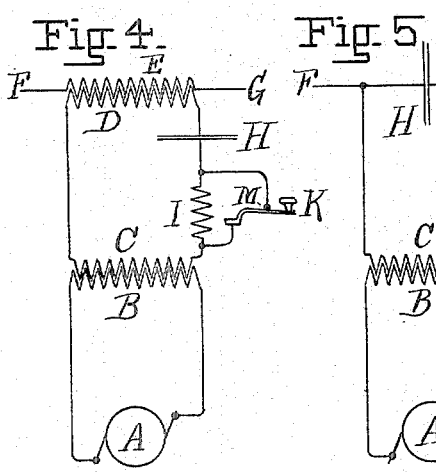
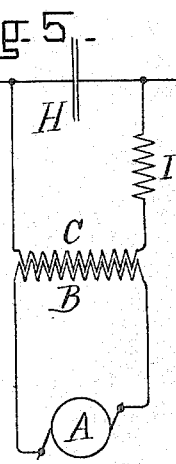
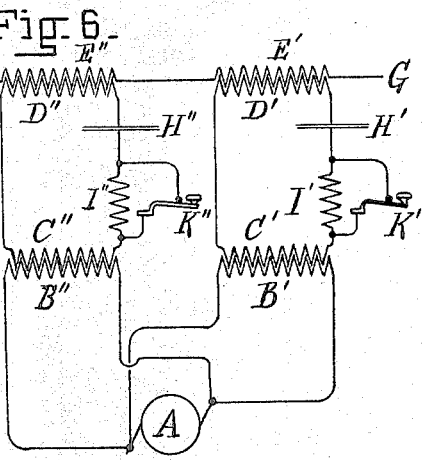
Witnesses:
Samuel W. Balch
H. J. Whitman
Inventor,
Michael I. Pupin,
by Thomas Ewing Jr.,
Attorney.

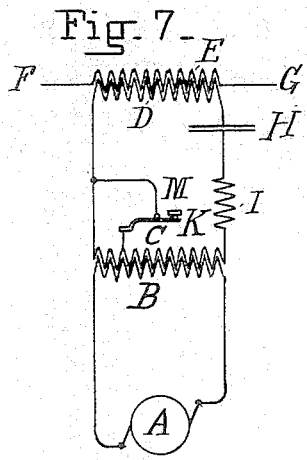
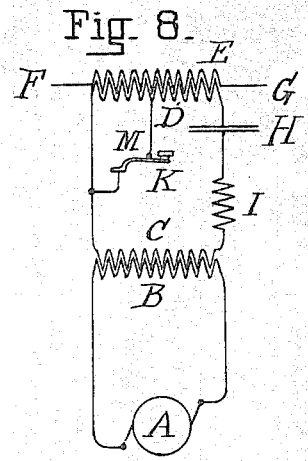
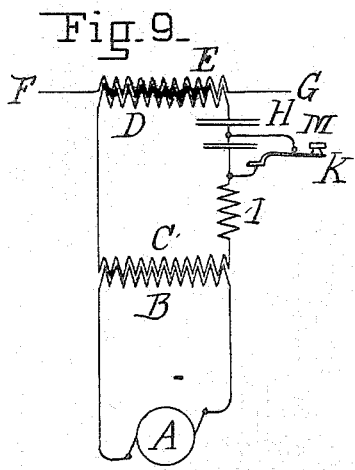
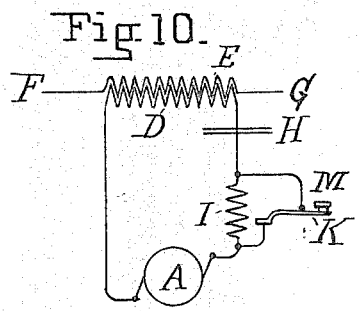

UNITED STATES PATENT OFFICE.

MICHAEL I. PUPIN, OF NEW YORK, N. Y.

ART OF DISTRIBUTING ELECTRICAL ENERGY BY ALTERNATING CURRENTS.

SPECIFICATION forming part of Letters Patent No. 640,515, dated January 2, 1900.

Application filed May 21, 1895. Renewed December 4, 1899. Serial No. 739,207. (No model.)

*To all whom it may concern:*

Be it known that I, MICHAEL I. PUPIN, a citizen of the United States of America, residing in the city, county, and State of New York, have invented certain new and useful Improvements in the Art of Distributing Electrical Energy by Alternating Currents, Especially for Electrical Signaling Purposes, of which the following is a specification.

It has long been known that if the primary circuit of a transformer be connected to a generator of alternating electromotive force and a primary current be established then there will be an electromotive force induced in the secondary circuit of the transformer, which under most favorable conditions is equal to the impressed primary electromotive force multiplied by the ratio of the secondary to the primary turns. Hence in step-up transformation—that is, in transforming from a given primary voltage to a higher secondary voltage—it is always thought necessary to make the number of turns in the secondary of the transformer greater than the number of turns in the primary coil. I have found that the induced secondary electromotive force can be increased very much without increasing the number of turns in the secondary circuit over that in the primary. This I accomplish by a rise in the primary current produced either by electrical resonance or by electrical consonance. In this manner I have increased in the secondary the impressed electromotive force fifty times, although the number of turns in the secondary coil was the same as that in the primary coil. Another and very desirable result also attained in connection with this increase of voltage consists in tuning the circuits electrically and weeding out the harmonics. These results are of the greatest importance in multiple telegraphy. I believe that I am the first investigator who has conducted any thorough investigation of these electrical resonance phenomena and the first to make the practical application of them as herein set forth. Some of these investigations have been published in *The American Journal of Science* for April, May, and June, 1893, and November and December, 1894; the *Transactions of the American Institute of Electrical Engineers* for June and July, 1893, and October, 1894, and *The Electrical World,* New York, for February 5, 1895, which may be read with this specification.

In the accompanying two sheets of drawings, Figure 1 is a diagram showing the essential elements of my invention. It shows a generator of periodic electromotive force acting inductively upon a circuit which contains a self-induction coil and an electrical condenser, which circuit acts inductively again upon a line conductor. Fig. 2 differs from the preceding in that the condenser is in multiple with the intermediate circuit. Fig. 3 differs from Fig. 1 in that a transformer is substituted for the condenser, the secondary of this transformer containing an auxiliary coil and the condenser. Fig. 4 is the same as Fig. 1 with the addition of an auxiliary coil in the intermediate circuit and a key by which a shunt around the auxiliary coil can be operated. Fig. 5 shows the intermediate circuit directly connected to the line at opposite sides of a condenser in the line. Fig. 6 shows two systems similar to Fig. 4 acted upon by the same generator and connected to the same line or common conductor. Figs. 7, 8, 9, and 10 are diagrams showing modifications.

Referring now particularly to Fig. 1, the transformer B C, the primary coil of which is connected to a generator A, has its secondary coil connected to the primary coil D of the transformer D E. A condenser H is connected in series with the primary D and the secondary C. The capacity of this condenser is adjusted until the circuit C D H is in resonance with the impressed electromotive force. When that point is reached, then the electromotive force induced in the coil E will be very much larger than if the condenser H were short-circuited. This rise of potential in the secondary coil E is especially marked if the induction-coil D E has no iron core and if the current in the circuit F E G is small—as, for instance, on long telegraph-lines having a large impedance.

In Fig. 2 is shown a parallel connection of the condenser H to the coils C and D. In this case the capacity of H is adjusted until it neutralizes the compound self-induction of the coils C and D for the given frequency of the impressed electromotive force. Resonance takes place then between the impressed electromotive force and the two circuits which are connected in multiple by the condenser H.

In Fig. 3 the condenser H is shown in a secondary circuit H R P. In this case the capacity of H is adjusted until the current in the circuit D Q C is a maximum. This will happen when the impedance of the circuit D Q C is reduced to a minimum by the reaction of the circuit containing the condenser. The circuit Q C D may be said then to be in electrical consonance with the impressed electromotive force. In all these cases the electromotive force induced in the secondary E will be much higher than could be obtained by the same arrangement of circuits, but without the condenser. By carefully avoiding the dampening effect of iron cores it has been possible in the manner described to increase in the secondary the impressed electromotive force over fifty times without using a larger number of turns in secondary coil E than are used in primary coil D. It is preferable and to a certain extent indispensable to employ coils without any iron cores. It is evident that many other forms of disposing the circuits may be employed; but the ultimate aim in all such arrangements is a resonant rise of the current in the induction-coil D and a corresponding resonant rise or voltage in the secondary coil E. It is also evident that in addition to the adjustable condenser H we may have in the induction-circuit an auxiliary coil of adjustable self-induction. (See coil R, Fig. 3; coil I, Figs. 4, 5, 7, 8, 9, and 10, and coils I' and I'', Fig. 6.)

Alternating-current generators produce complex harmonic electromotive forces—that is, electromotive forces in which, in addition to the fundamental frequency, there are upper harmonics which in general are odd multiples of the fundamental frequency. If the circuit of the alternator is rendered resonant or consonant to any one of these frequencies by the reaction of a condenser, then the current of the alternator will to all practical purposes be a simple harmonic current. This is especially true when the self-induction of the circuit is high. Referring now to Fig. 1, for example, it can be easily seen that when the condenser H renders the circuit H D C resonant to, say, the fundamental frequency of the generator A, then the electromotive force induced in E will not only be much higher than ordinarily, but it will also be practically a simple harmonic. The same method of weeding out harmonics I employ successfully for the purpose of obtaining several electromotive forces of different frequencies from the same alternator. Fig. 6 is an electrical diagram illustrating this application of resonant circuits described in this specification. The alternator is connected to two transformers B' C' and B² C². The secondary circuits of these transformers act inductively upon the common conductor F G. One of these secondary circuits is tuned to the fundamental frequency of the alternator and the other is tuned to one of the stronger upper harmonics. There will then be two distinct independent electromotive forces of different frequencies impressed upon the common conductor, just the same as if we had two alternators acting upon the common conductors. In the same manner it is possible to obtain more than two frequencies from the same machine—that is, if the machine be constructed in such a way as to give an electromotive force rich in upper harmonics, which is a very simple practical problem. It is obvious that this method of transformation can be employed in all cases where it is required to transmit electrical energy over lines possessing a very high impedance—as, for instance, over long telegraph-lines. I shall describe a particular case for the purpose of illustrating the usefulness of my invention; but I do not wish to limit my claims by this particular case, for the broad invention herein described is not restricted as to the manner or means whereby the electromotive force induced upon the line or conductor at a transmitting-station is conveyed to or received at the receiving-station.

The diagram given in Fig. 4 illustrates the application of my invention to telegraphy. F G is the line. E is the secondary of the transformer E D. I is an auxiliary coil. K is a telegraph-key which when pressed down breaks a contact at M. This contact short-circuits the coil I. Hence when the key is depressed the self-induction of I becomes an effective part of the self-induction of the current C I H D. The capacity of H is adjusted in such a way that with the self-induction of the coils C, D, and I it produces resonance between the circuit C I H D and one of the frequencies of the impressed electromotive force—say the fundamental frequency. Hence whenever the key K is depressed there is a big voltage—say one thousand volts— induced in the coil E on account of the resonant rise of current in the inducing-circuit. When, however, the key is not depressed and the contact at M short-circuits the coil I, then the resonance in the inducing-circuit subsides and the electromotive force in E will sink down to a few volts, even if the self-induction of I is only one-twentieth part of the total self-induction of the inducing-circuit. The larger the coil I the more complete is the subsiding of the resonant current when this coil is short-circuited, but the higher will be the voltage between the contact-points at M at the moment of short-circuiting, which may result in objectionable sparking. I have found that when the self-induction of I is about one-tenth of the total self-induction of the inducing-circuit and the resonant rise of voltage in E is about one thousand volts then there will be practically no appreciable sparking between the contact-points at M. It is obvious that the key K may be connected in shunt with an auxiliary condenser arranged in circuit C H D in series with condenser H, (see Fig. 9,) or key K may be connected with a certain number of turns of the coil D (see Fig. 8) or C. (See Fig. 7.) By its making the contact M it will destroy the established resonance in the inducing-circuit, as above. Whenever the key K is pressed and the contact M is broken, there will be a series of alternating-current waves sent upon the line F G, which waves will be many times more powerful than if the electromotive force generated in C were impressed directly upon the line. Even when the contact M is not broken there will still be some electromotive force induced upon the line; but this electromotive force will be too small to produce a current sufficiently strong to work the receiving apparatus at the receiving end of the line.

In multiple telegraphy by electrical resonance there may sometimes be a large number of coils like E in series in the line. Hence these coils give the line a large impedance, and it is very important then to impress upon the line a large electromotive force at the sending end without employing too large a coil E. The method just described enables me to do this in a perfectly satisfactory manner. In the system of multiplex telegraphy just mentioned each receiving-circuit is tuned to electrical resonance with one of the electromotive forces impressed upon the line at the sending end. Hence it is important that each electromotive force impressed upon the line at the sending end be as nearly a simple harmonic as possible. Otherwise its upper harmonics might be nearly equal to the frequency of some other electromotive force impressed at the sending station, in which case confusion would arise in the signals received at the receiving station. The methods described above obviate this difficulty completely. A high-voltage simple harmonic electromotive force may also be impressed upon a line by an arrangement of resonant circuits represented by the diagram in Fig. 5. Here the condenser H is in series with the line and also with the circuit supplying the impressed electromotive force. Its capacity is adjusted until the circuit H I C is in resonance with the impressed electromotive force. The difference of potential in the condenser-plates may thus be made practically anything we please, as I have shown in my publications cited above, and the weeding out of harmonics is just as effective in this case as it is in the cases described above. In fact, there is no essential difference between this particular arrangement and the arrangements described above and shown in the other figures herein. In each case the exciting-circuits act upon the main line through elements which are placed in the main line in series with each other. In Fig. 5 these elements are condensers H. In the other figures they are the secondaries of induction-coils.

While reference is made to publications mentioned above for complete discussion of the principles involved in the methods and apparatus described herein, it may be stated generally that except when aided by electrical resonance or electrical consonance the electromotive motive force in the secondary coils E in the line increases as the number of turns, while the impedance increases as the square of the number turns. Hence the great advantage of keeping down the number of turns. Again, the frequency or periodicity of any circuit depends upon the product of the capacity and the self-induction of the circuit. Therefore by varying either or both the circuit can be brought into resonance with any desired frequency.

It is evident that the generator may be connected directly in the induction-circuit, thus dispensing with the employment of the intermediate transformer. (See Fig. 10.) The generator-circuit and the induction-circuit are thus consolidated into one circuit, which is both an induction and a generator circuit; but the arrangement shown herein, in which there is an induction-circuit connected to the generator-circuit through one transformer and to the line conductor through another transformer, though involving an additional circuit, is preferred, because with it it is not necessary to have a large current in the generator and also because owing to the iron in the generator the resonance phenomena are not so pronounced when the armature of the generator forms a part of the resonance-circuit, and therefore it is not so easy to throw the circuit out of tune with the impressed electromotive force for the purpose of signaling.

It will be seen from the foregoing that the electrical system herein shown comprises a main circuit F G and a number of independent auxiliary circuits C D H, which serve to convey the electrical energy from the generators to the main circuit. The auxiliary circuits may therefore be called "exciting-circuits." It is one of the characteristic features of this system that the main conductor forms a complete electrical circuit even if all the exciting-circuits be broken. It is another characteristic feature that the exciting-circuits are independent of each other in the sense that they are electrically related to the main line by entirely independent elements and therefore no change in the electromagnetic constants of one, however great, will produce any serious change in the electromagnetic constants of any other. I mean by "serious" change a change which would interfere seriously with the selectivity of the exciting-circuits when used in practicing the invention herein described. This is clearly a very important feature in electrical multiple signaling, to which the system herein set forth is mainly applicable and in which each transmitting-station must be operable independently of the conditions existing at the other stations and whether they are operating or not.

Where in the claims I specify that each of the exciting-circuits contains a generator of electromotive force, I mean to include both of the cases above described—to wit, that in which the generator is inductively related to the exciting-circuits and that in which the generator is connected directly in the exciting-circuit, since these are equivalents of each other.

In this application I do not broadly claim any method of or apparatus for distributing the electromotive forces of different frequencies each selectively to a separate electrical translating device by the proper proportioning of the electromagnetic constants of the parts of the electrical system to be made selective and by which the translating devices are controlled, either with or without any method of or arrangement of apparatus for developing upon a main line or common conductor the electromotive forces of different frequencies independently of each other and simultaneously or otherwise; nor do I claim the more limited but broad method of or apparatus for throwing such currents on the line or common conductor at the transmitting-station, as distinguished from maintaining a number of currents on the line and varying their strength by operations at the transmitting-station, because these broad inventions are claimed, substantially, in my other application, filed on the 23d day of February, 1894, serially numbered 501,092, for multiple telegraphy, which application is now involved in interference, and in my other application for telegraphy, filed January 28, 1895, serially numbered 536,488; nor do I in this application claim the combination of means for imposing upon an electric circuit electromotive forces of previously-selected periodicities, one or more circuits in inductive relation to the said first-named circuit or to a branch of it, and means for electrically tuning each of said inductively-related circuits into electrical resonance with any of the impressed periodic electromotive forces and independently of the rest of the system, for such an invention is claimed in my said application, serially numbered 536,488; nor do I in this application make any claim to a resonance-circuit in which the self-induction coil employed to give the circuit a definite periodicity contains no iron or any claim specific thereto; nor do I herein claim the combination of a main line, mutually-independent exciting-circuits which act upon the main line through elements placed therein in series, independent means for impressing an electromotive force of desired frequency upon the main line at each exciting-circuit, mutually-independent receiving-circuits, means for tuning each receiving-circuit to resonance with one of the impressed electromotive forces, and translating devices operated by the current in the receiving-circuits; nor do I here claim the combination of a line-wire, a condenser or condensers therein in series, a shunt around each condenser, containing a self-induction coil, thus forming a resonance circuit or circuits, and means for adjusting the electromagnetic constants of the resonance circuit or circuits, so as to give a desired periodicity, these being all claimed in my other application for improvements in electrical transmission by resonance-circuits, filed May 28, 1895, serially numbered 550,937, and renewed October 14, 1896, as Serial No. 608,890.

Having now described my invention, without limiting myself to the precise details shown, what I claim, and desire to secure by Letters Patent of the United States, is—

1. In an electric signaling system the combination of a common conductor, exciting-circuits, means for generating electromotive forces of different periodicities acting on the exciting-circuits, there being a generator of one of the electromotive forces in each exciting-circuit, and means for tuning each exciting-circuit independently of the other exciting-circuits, to the periodicity of that electromotive force which it conveys to the common conductor, substantially as described.

2. In an electric signaling system the combination of a common conductor, exciting-circuits connected up to the common conductor and acting upon it through elements which are placed in the common conductor in series, means for generating electromotive forces of different periodicities acting on the exciting-circuits, there being a generator of one of the electromotive forces in each exciting-circuit, so that each exciting-circuit conveys one of the electromotive forces of different periodicities to the common conductor, and means for tuning each exciting-circuit independently of the other exciting-circuits, to the periodicity of that electromotive force which it conveys to the common conductor, substantially as described.

3. In an electric signaling system the combination of an electrically complete and independent main line, exciting-circuits, means for generating electromotive forces of different periodicities acting on the exciting-circuits, there being a generator of one of the electromotive forces in each exciting-circuit, so that each exciting-circuit conveys one of the several electromotive forces of different periodicities to the main line, and means for tuning each exciting-circuit independently of the other exciting-circuits, to the periodicity of that electromotive force which it conveys to the main line, substantially as described.

4. In an electric signaling system the combination of an electrically complete and independent main line, exciting-circuits connected up to the main line and acting upon it through elements which are placed in the main line in series, means for generating electromotive forces of different periodicities acting on the exciting-circuits, there being a generator of one of the electromotive forces in each exciting-circuit, so that each exciting-circuit conveys one of the several electromotive forces of different periodicities to the main line, and means for tuning each exciting-circuit, independently of the other exciting-circuits, to the periodicity of that electromotive force which it conveys to the main line, substantially as described.

5. In an electrical system the combination of an electrically complete and independent main line containing in series secondary coils of transformers, exciting-circuits each of which contains the primary coil of one of the transformers, means for generating electromotive forces of different periodicities acting on the exciting-circuits, there being a generator of one of the electromotive forces in each exciting-circuit, so that each exciting-circuit conveys one of the several electromotive forces of different periodicities to the main line, and means for tuning each exciting-circuit, independently of the other exciting-circuits, to the periodicity of that electromotive force which it conveys to the main line, substantially as described.

6. In an electrical system the combination of a common conductor, an exciting-circuit, means for generating electromotive force of definite periodicity acting on the exciting-circuit, so that the exciting-circuit conveys the electromotive force to the common conductor, means for tuning the exciting-circuit to the periodicity of the electromotive force which it conveys to the common conductor, and a key connected to the exciting-circuit in such a way that upon its being operated it changes the conditions of resonance in the exciting-circuit, substantially as described.

7. In an electric signaling system the combination of an electrically complete and independent main line, exciting-circuits, means for generating electromotive forces of different periodicities acting on the exciting-circuits, so that each of the exciting-circuits conveys one of the electromotive forces of different periodicities to the main line, means for tuning each exciting-circuit to the periodicity of the electromotive force which it conveys to the main line, and a key connected to each exciting-circuit in such a way that upon its being operated it changes the conditions of resonance in the exciting-circuit in which it is connected, substantially as described.

8. In an electric system a line, a tuned induction-circuit for impressing an electromotive force thereon, means for supplying the induction-circuit with a current of a frequency with which it is in tune, and a key so connected that when it is operated it changes the conditions of resonance in the induction-circuit, substantially as described.

9. In an electric signaling system the combination of an electrically complete and independent main line, tuned induction-circuits for impressing electromotive forces of different periodicities thereon, means for supplying each induction-circuit with a current of a frequency with which it is in tune, and a key in each induction-circuit so connected that when it is operated it changes the conditions of resonance in the induction-circuit in which it is connected, substantially as described.

10. In a system for impressing upon a conductor a simple harmonic current, the combination of the conductor, an induction-circuit, means for generating an alternating electromotive force therein, means constituting an adjustment for varying the constants of the induction-circuit so as to bring it into tune with the frequency of the current to be impressed upon the conductor, and means independent of said adjustment for throwing the induction-circuit out of and into tune with said frequency, substantially as described.

11. In a system for impressing upon a conductor a simple harmonic current and varying the intensity thereof abruptly through wide range, the combination of the conductor, an induction-circuit containing self-induction coils and condensers, means for generating an alternating electromotive force in the induction-circuit, a shunt around self-induction coils and means for opening and closing the shunt, substantially as described.

12. In a system for impressing upon a conductor a simple harmonic current and varying the intensity thereof abruptly through wide range, the combination of a conductor, a generator-circuit, means for generating an alternating electromotive force therein, and an induction-circuit containing self-induction coils and condensers, a shunt around self-induction coils and means for opening and closing the shunt, substantially as described.

13. In a system for impressing upon a conductor a simple harmonic current and varying the intensity thereof abruptly through wide range, the combination of a conductor, a generator-circuit, means for generating an alternating electromotive force therein, an induction-circuit containing self-induction coils and condensers, a shunt around self-induction coils, means for bringing the induction-circuit in tune with the frequency of the current to be impressed, and means for opening and closing the shunt, substantially as described.

Signed by me in New York city, New York, this 20th day of May, 1895.

MICHAEL I. PUPIN.

Witnesses:
SAMUEL W. BALCH,
S. KATHARINE PUPIN.